UNITED STATES PATENT OFFICE.

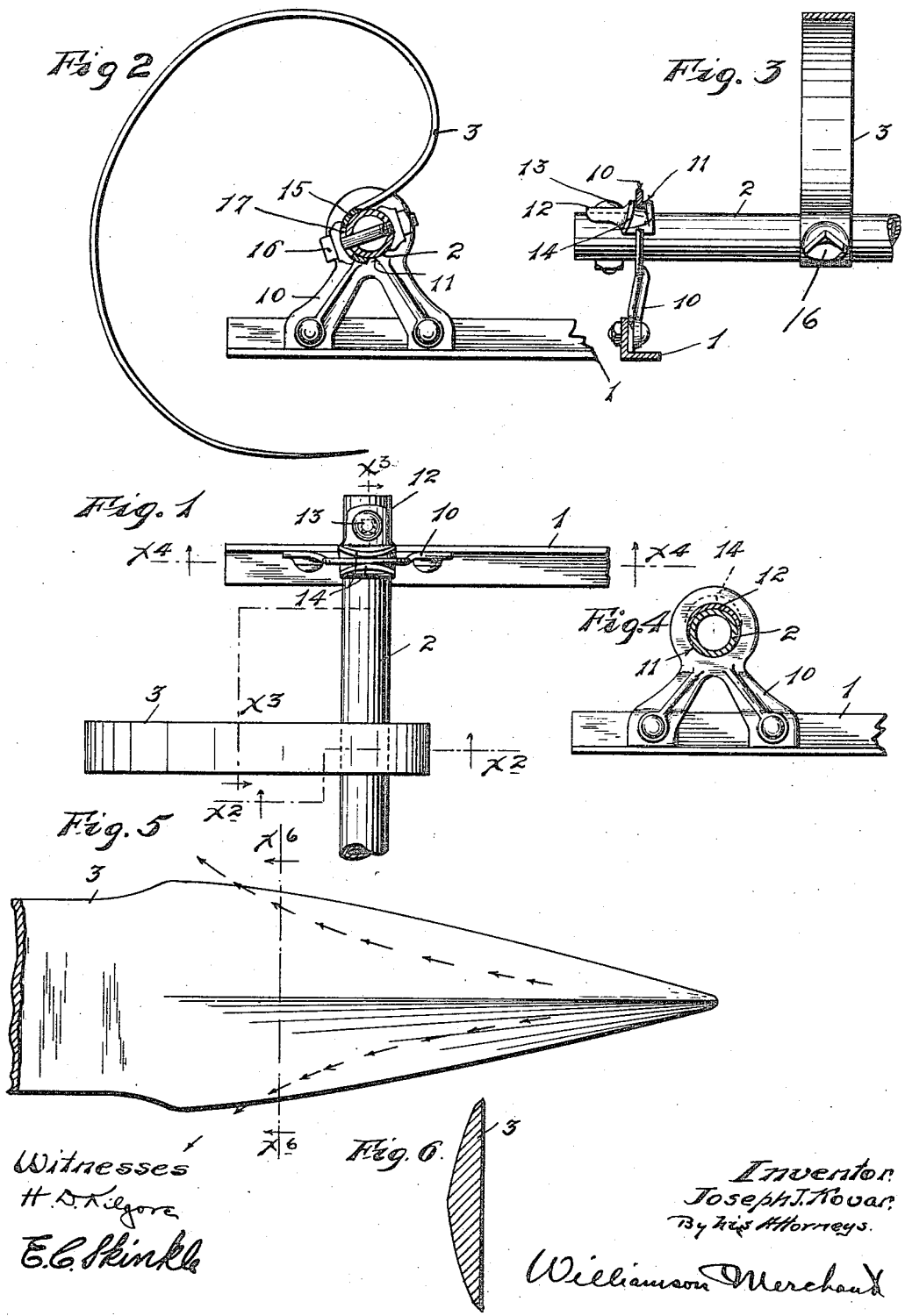

JOSEPH J. KOVAR, OF DODGE CENTER, MINNESOTA.

SPRING-TOOTHED HARROW.

1,266,489.   Specification of Letters Patent.   Patented May 14, 1918.

Application filed July 16, 1915. Serial No. 40,227.

*To all whom it may concern:*

Be it known that I, JOSEPH J. KOVAR, a citizen of the United States, residing at Dodge Center, in the county of Dodge and State of Minnesota, have invented certain new and useful Improvements in Spring-Toothed Harrows; and I do hereby declare the following to be a full, clear, and exact description of the invention, such as will enable others skilled in the art to which it appertains to make and use the same.

My present invention relates to improvements in spring-toothed harrows and is in the nature of an improvement on my co-pending application filed January 23rd, 1914, under Serial Number 813,872, entitled "Spring-toothed harrow".

To the above end, generally stated, the invention consists of the novel devices and combinations of devices hereinafter described and defined in the claim.

In the accompanying drawings, which illustrate the invention, like characters indicate like parts throughout the several views.

Referring to the drawings:

Figure 1 is a fragmentary plan view of the improved harrow;

Fig. 2 is a view principally in side elevation with some parts sectioned on the irregular line $x^2$ $x^2$ on Fig. 1;

Fig. 3 is a view in rear elevation and partly in transverse vertical section taken on the irregular line $x^3$ $x^3$ on Fig. 1.

Fig. 4 is a detail view with some parts sectioned on the line $x^4$ $x^4$ on Fig. 1;

Fig. 5 is a fragmentary detail view of one of the harrow teeth on an enlarged scale; and Fig. 6 is a detail view in section taken on the line $x^6$ $x^6$ on Fig. 5.

Each section or unit of the improved harrow comprises a pair of laterally spaced forwardly and rearwardly extended drag bars 1, a plurality of tubular rock shafts 2, flexibly connected to the drag bars 1, and a plurality of spring harrow teeth 3 mounted on each of the said rock shafts. In the drawings, only the rear end portion of one of the drag bars 1, the connected end portion of the rear rock shaft 2 and one of the harrow teeth, are illustrated.

As shown and described in my above identified application, the forward ends of the drag bars 1 of each section or unit are flexibly connected, one to the other, and in turn, to a common equalizing beam, and the rock shafts 2 are connected by a link and oscillated by a hand lever to set the same in different positions for simultaneously moving the harrow teeth to and from operative positions, and to vary the depth they are to enter the ground.

One of the flanges of the drag bar 1 is turned horizontally inward, and the other flange thereof, projects vertically upward. A bracket 10 rests on the horizontal flange of the drag bar 1 and is bolted to the inner face of the vertical flange thereof. In the upper portion of the bracket 10 is formed a relatively large bearing eye 11, through which the shaft 2 is loosely telescoped. The rock shaft 2 is held, by a saddle plate 12, against endwise movement in the bearing eye 11, but with freedom for rotary movement and to assume different vertical and horizontal angular positions in respect to the drag bar 1.

The saddle plate 12 is segmental in cross section, rests directly on the rock shaft 2 and is rigidly and detachably secured thereto by a nut-equipped bolt 13. This bolt 13 is passed through axially alined holes in the saddle plate 12 and rock shaft 2, and is held against rotation, by forming the hole in the saddle plate square to receive the equared upper end portion of said bolt. Inward of the bolt 13, the saddle plate 12 is extended through the bearing eye 11 and has integrally formed therewith a pair of laterally spaced upwardly extended flanges 14. At the longitudinal center of the saddle plate 12, these flanges 14 closely embrace the bracket 10, upward from its eye 11, to prevent endwise movement of the rock shaft 2 in said bearing eye 11. From the longitudinal center of the saddle plate 12, these flanges 14 diverge is opposite directions to permit both vertical and horizontal angular movements of the rock shafts 2 with respect to the drag bar 1.

In assembling the above described parts, the saddle plate 12 is first interlocked with the bracket 10, as best shown in Fig. 3, next the rock shaft 2 is telescoped through the bearing eye 11, under the saddle plate 12, and finally, the bolt 13 is passed through the alined holes in the saddle plate 12 and rock shaft 2, to hold the assembled parts in position.

The harrow tooth 3 is of curved and approximately involute form and is constructed from a flat spring steel bar, upset to form a sharp substantially diamond point at the free end of the tooth, for engagement with the ground. The other end of the tooth 3 is bent to form a seat 15 in which the rock shaft 2 is seated. This seat 15 has the same curvature as the rock shaft 2 and engages the same throughout substantially one half its circumferential surface.

The tooth 3 is rigidly secured to the rock shaft 2 with freedom for a limited circumferential adjustment thereon, by a nut-equipped bolt 16 passed through alined perforations in the rock shaft 2 and through a longitudinally extended slot 17, formed in the seat 15 of said tooth. The curvature of the tooth 3, at its free end portion, is comparatively flat and the under face of its point is flat, and the upper face thereof is convex. From the above description, it is evident that in the operative position of the tooth 3, the point thereof is approximately horizontally exposed and is arranged to move endwise, horizontally through the ground.

The shape of the point of the tooth 3 and the operative position in which it is held is highly important. As the point of the tooth 3 is passed through the ground, the earth moves thereover, rearward, and at the same time, laterally, in opposite directions from the longitudinal center of the tooth, as indicated by arrows marked thereon in Fig. 5. The movement of the earth over the harrow tooth, produces the very best scouring action thereon and it also carries vegetable matter, sticks, etc., away from the upwardly and forwardly curved body of the tooth and prevents the same from clogging thereon.

In the operative position of the harrow tooth 3, the point thereon is substantially vertically below the rock shaft 2 and projects slightly upward. Under the pulling strain on the harrow, the curvature of the tooth 3 will be slightly flattened, thereby causing the free end of the tooth to assume a position slightly backward of its normal position so that it moves horizontally through the ground. However, the point of the tooth 3 may be set in slightly different adjustments longitudinally of the harrow by loosening the bolt 16 and giving the tooth 3 a slight rotary movement on the rock shaft 2.

What I claim is:

A harrow having a curved tooth formed from a single piece of metal with a substantially diamond-shape point projecting forwardly and normally slightly upward, said tooth slightly straightening under pulling strains to thereby cause its point to assume an approximately horizontal position and move endwise through the ground, the lower face of the point being flat throughout its entire width and the upper face thereof being convex with its greatest thickness at the longitudinal center of tooth.

In testimony whereof I affix my signature in presence of two witnesses.

JOSEPH J. KOVAR.

Witnesses:
 Eva E. König,
 Harry D. Kilgore.

Copies of this patent may be obtained for five cents each, by addressing the "Commissioner of Patents, Washington, D. C."